United States Patent
Li

(10) Patent No.: US 7,269,728 B1
(45) Date of Patent: Sep. 11, 2007

(54) APPARATUS AND METHOD FOR DISTRIBUTING MANAGEMENT KEYS IN A MULTICAST DOMAIN

(75) Inventor: Yunzhou Li, Lowell, MA (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/400,132

(22) Filed: Sep. 21, 1999

(51) Int. Cl.
*H04L 9/00* (2006.01)
(52) U.S. Cl. ...................... 713/163; 713/162
(58) Field of Classification Search ........ 713/162–163; 370/468, 329; 455/452, 453; 348/14.01–14.09; 380/277–278
See application file for complete search history.

(56) References Cited

U.S. PATENT DOCUMENTS

| | | | | |
|---|---|---|---|---|
| 5,150,358 A | * | 9/1992 | Punj et al. | 370/418 |
| 5,359,601 A | * | 10/1994 | Wasilewski et al. | 370/486 |
| 5,642,153 A | * | 6/1997 | Chaney et al. | 725/40 |
| 5,737,011 A | * | 4/1998 | Lukacs | 348/14.09 |
| 6,073,235 A | * | 6/2000 | Foladare et al. | 713/163 |
| 6,195,751 B1 | * | 2/2001 | Caronni et al. | 713/163 |
| 6,215,877 B1 | * | 4/2001 | Matsumoto | 380/277 |
| 6,295,361 B1 | * | 9/2001 | Kadansky et al. | 380/278 |
| 6,330,671 B1 | * | 12/2001 | Aziz | 713/163 |

OTHER PUBLICATIONS

L. H. Ngoh, Multicast support for group communications, Computer Networks and ISDN Systems, Elsevier Science Publishers, 22 (1991) Oct. 7, No. 3.
Peter S. Kruus et. al., Techniques and Issues in Multicast Security, pp. 1028-1032, XP-000828878.
Francisco Jordan et. al., Secure Multicast Communications using a Key Distribution Center, Information Networks and Data Communication. (C-23) 1994.
European Patent Application, EP 0 902 569 A1, Application # 98116496.5, Filed, Sep. 1, 1988.
Wong, et al., *Secure Group Communications Using Key Graphs*, Proceedings of ACM SIGCOMM '98, Sep. 2-4, 1998.
Internet Engineering Task Force, Internet Draft, Bay Netwroks, Inc., Aug. 1998.

* cited by examiner

*Primary Examiner*—Hosuk Song
*Assistant Examiner*—Paula Klimach
(74) *Attorney, Agent, or Firm*—McGuinness & Manaras LLP

(57) ABSTRACT

A method and apparatus for distributing keys in a multicast domain is provided. In a secure multicast domain, a request to join a multicast group for a time period occurs. A key distributor which controls access to the multicast data group determines if the request will be accepted. If the request is accepted the key distributor assigns the member to a virtual channel, wherein each virtual channel is defined by a time period. A data group key is forwarded to the member as is a virtual channel key. The member can then receive and decode events from the data group on the assigned virtual channel.

92 Claims, 12 Drawing Sheets

APPARATUS AND METHOD FOR DISTRIBUTING MANAGEMENT KEYS IN A MULTICAST DOMAIN

FIELD OF THE INVENTION

The invention generally relates to computers and, more particularly, the invention relates to multicast transmissions.

BACKGROUND OF THE INVENTION

Multicasting is a well known method of transmitting messages to selected groups of users across a network, such as the Internet. One simple example of multicasting entails transmitting an E-mail message to a plurality of users that each are on a mailing list. Video conferencing and teleconferencing also use multicasting principles and thus, often are referred to as "multiconferencing."

Security in multicast broadcasts is often provided by encrypting the data and dispensing a unique cryptographic key to each of the group members. In a multicast environment, each time the membership of the group changes the data group key must be redistributed to maintain security. Redistribution occurs via a unicast session between a key distributor and each member of the group. If the membership changes often, a new unicast session must be established for each member of the group and a new data group key must be sent. This constant rekeying is an inefficient use of bandwidth.

SUMMARY OF THE INVENTION

In accordance with one aspect of the invention, a method and apparatus for distributing keys in a multicast domain is provided. In a secure multicast domain, a request to join a multicast group for a time period occurs. A key distributor which controls access to the multicast data group determines if the request will be accepted. If the request is accepted the key distributor assigns the member to a virtual channel, wherein each virtual channel is defined by a time period. A data group key is forwarded to the member as is a virtual channel key. The member can then receive and decode events from the data group on the assigned virtual channel.

When a virtual channel is formed, the virtual channel's time period may be defined by an upper bound and a lower bound. When a member joins a virtual channel the member's duration may be less than the duration of the virtual channel thereby falling between the virtual channel's upper and lower bound. When membership of a virtual channel changes the virtual channel key is rekeyed from the key distributor.

The key distributor may form a permanent virtual channel which is associated with an unlimited time duration and the key distributor may make a member a temporary member if the member's time duration is less than all of the virtual channel's lower bounds. Members which are part of a virtual channel may be either lower members or upper members. Lower members' time duration falls between the lower and upper bounds of the virtual channel. An upper member has a time duration which is above the upper bounds of the virtual channel.

When a virtual channel becomes freed, as the result of an upper member leaving the virtual channel; all lower members expiring while there is no upper member whose due date is equal or earlier than the upper bound in the virtual channel; or some lower member expiring while the other lower members become temporary members; the virtual channels are rotated. As the virtual channels are rotated the upper and lower bounds of each virtual channel are reassigned. If no members of a virtual channel change during the process of rotation the virtual channel key need not be rekeyed.

In accordance with another aspect of the invention, another method and apparatus for distributing keys in a multicast is provided. A secure multicast session is created in a domain having a plurality of virtual channels that each have members. each member is associated with one of the plurality of multicast virtual channels based on a time-based distribution policy. The virtual channel keys are distributed to the members and each member receives one virtual channel key based upon their associated virtual channel. The virtual channel keys are rekeyed when membership of the virtual channel changes. Further, in the act of distributing the virtual channel key, the virtual channel key is sent in a unicast session to each member. Each virtual channel may be associated with a time duration and no member can be in more than one virtual channel. In addition to the virtual channel key, the data group members receive distribution of a data key by means of the virtual channel. The time duration of a virtual channel may be reassigned if the virtual channel is freed. In an alternative embodiment, the time duration of all virtual channels are reassigned if any virtual channel is freed. The act of reassigning may require reconfiguring the lower and upper bounds of all virtual channels.

Preferred embodiments of the invention are implemented as a computer program product having a computer usable medium with computer readable program code thereon. The computer readable code may be read and utilized by the computer system in accordance with conventional processes.

BRIEF DESCRIPTION OF THE DRAWINGS

The foregoing and other objects and advantages of the invention will be appreciated more fully from the following further description thereof with reference to the accompanying drawings wherein.

DESCRIPTION OF SPECIFIC EMBODIMENTS

The term "domain" in this specification and the appended claims shall refer to a group of computers or devices on a network that are administered as a unit with common rules and procedures. Within the Internet, domains are defined by the IP address. All devices sharing a common part of the IP address are said to be in the same domain.

Figure 1:
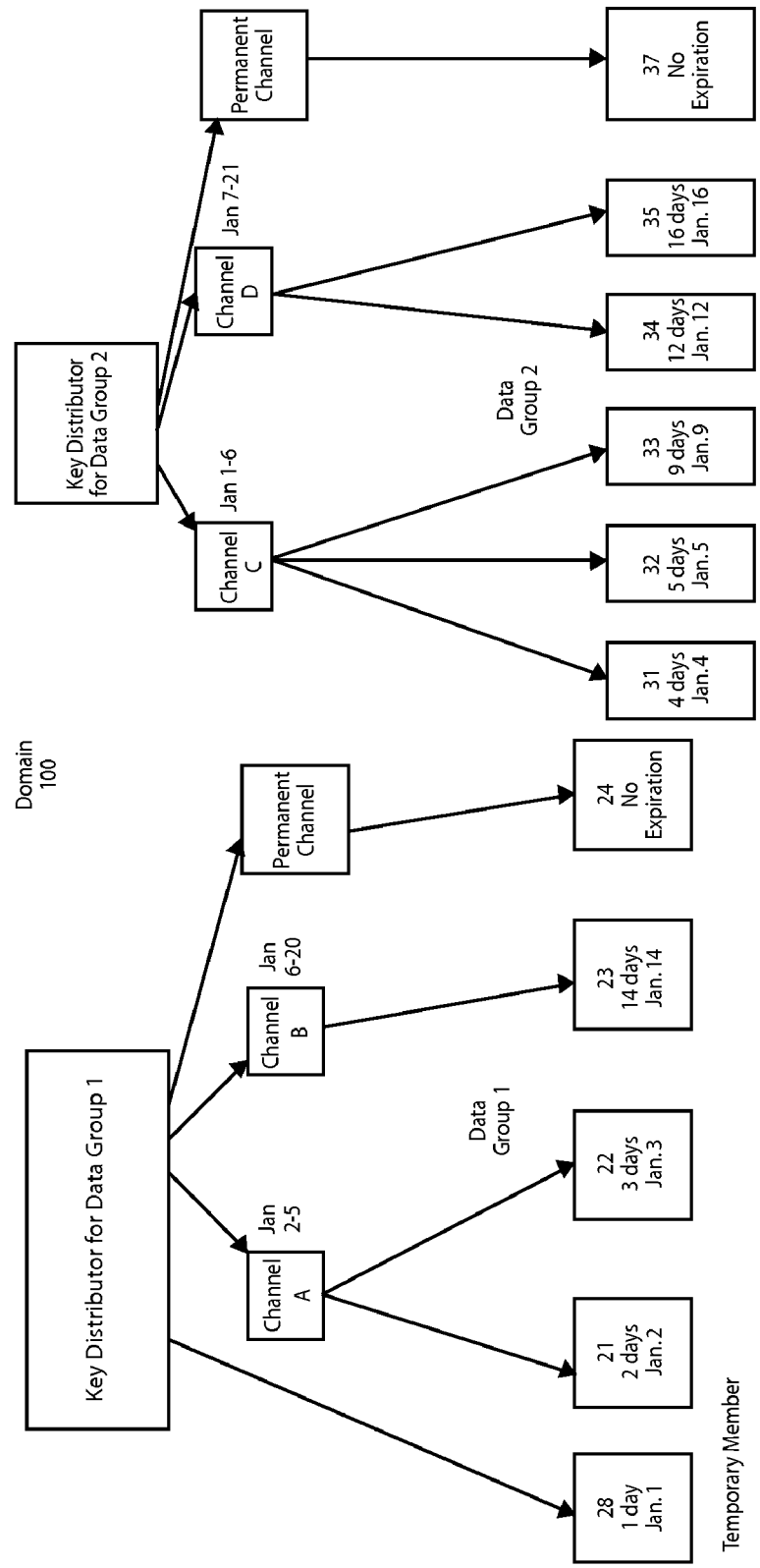
FIG. 1 shows two data groups in a domain which receive encryption keys from a key distributor.

FIG. 1 schematically shows an exemplary multicast domain 100 in which preferred embodiments of the invention may be implemented. The domain 100 preferably is executing in accordance with a known multicast protocol, such as the protocol independent multicast protocol ("PIM protocol"). Principles of the invention may be applied to other multicast protocols, such as the Multicast Extension to OSPF (Open Shortest Path First).

A multicast data group, or simply a data group, is a multicast address representing a community of members who are interested in particular stream(s) of data. In FIG. 1, two multicast data groups are shown for exemplary purposes. Both data group 1 and data group 2 reside within secure domain 100. FIG. 1 also shows a key distributor (KD) which is a key management entity that is responsible for distributing/redistributing keys to individual members of a multicast group to maintain security. In FIG. 1 there are two key distributors, one for each data group. In other embodiments there may only be one key distributor for multiple data groups.

Becoming a Member

Figure 2:
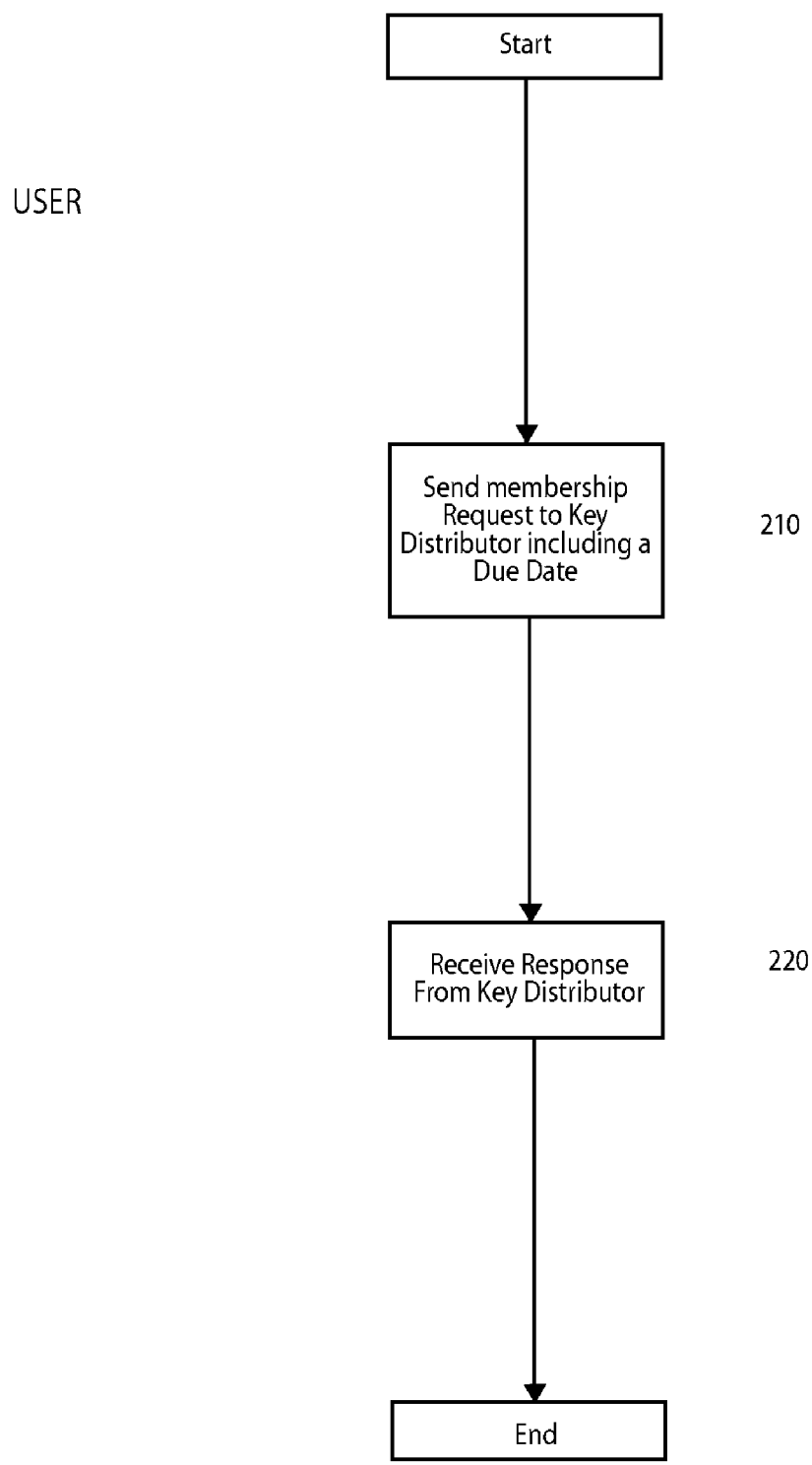
FIG. 2 is a flow chart showing the steps taken by a user to become a member of a data group.

FIG. 2 shows a flow chart of the steps taken by a member joining a data group. A user wishing to become a member of a multicast data group joins the multicast data group using IGMP (Internet Group Management Protocol). IGMP is a well known protocol in the art. Further, the user indicates a time period for which to join the group (210). A user then receives a response from the key distributor. (220). The key distributor may reject or accept the user based on data group acceptance criteria. The acceptance criteria is described below. Upon acceptance to the data group, the user becomes a member. A member may either be a temporary member and not assigned to a virtual channel or a regular member and assigned to a virtual channel. A virtual channel is a logical communication link between the key distributor and a subset of data group members. Typically, a virtual channel is identified by an administratively-scoped multicast address. A member then receives a virtual channel key if the member is a not a temporary member. Thereafter, the member receives the data group key via the virtual channel or if a temporary member by a unicast session. Data from the data group is then distributed. The data is transmitted in encrypted form to the user via the virtual channel. If the member is a temporary member the data is received through a unicast session. The data is decrypted by applying the data group key. The data may then be accessed by the member.

The Key Distributor

Figure 3:
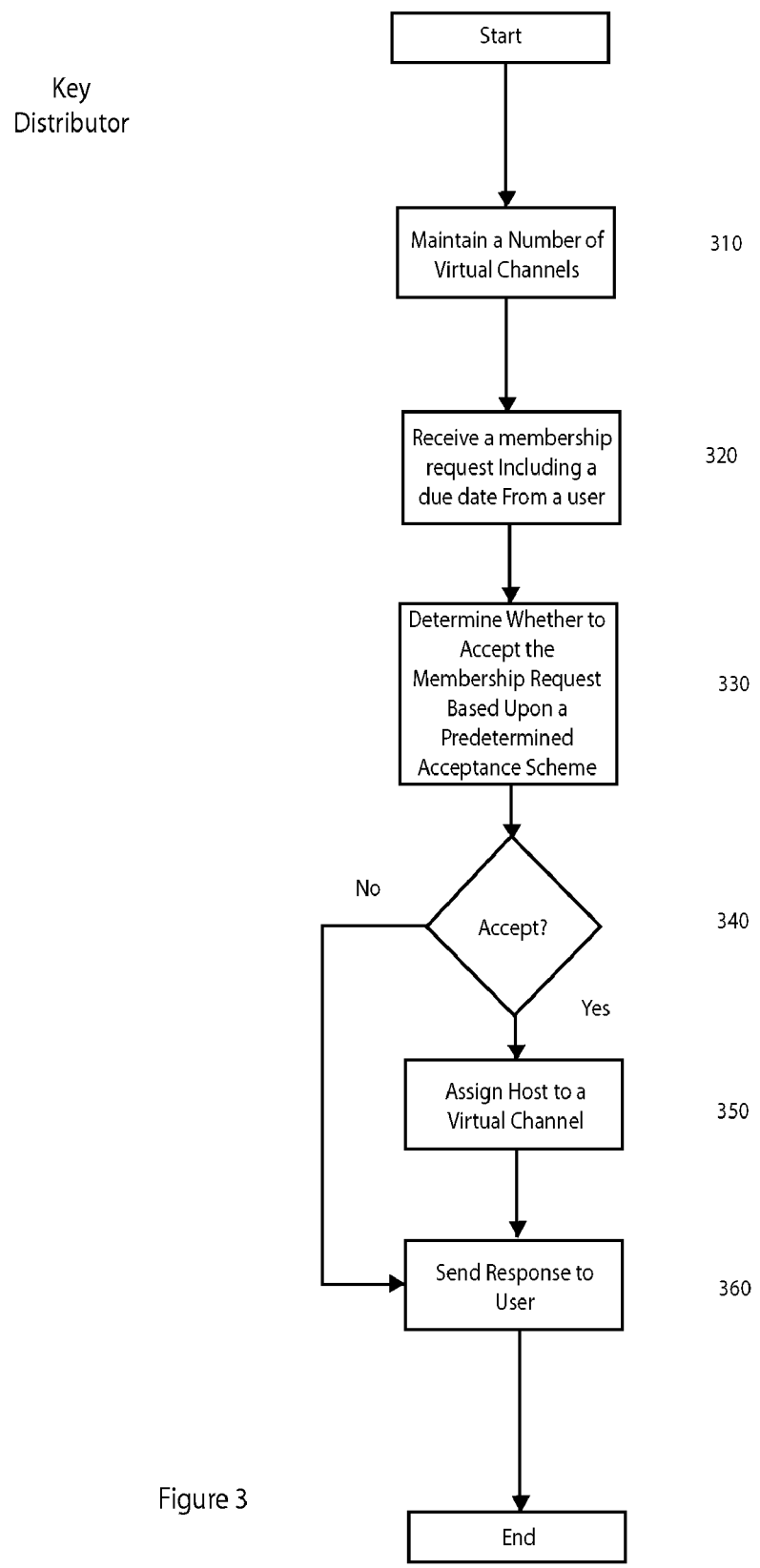
FIG. 3 is a flow chart which shows the steps taken by a key distributor in determining if a user should become a member of a data group.

The key distributor contains a distribution policy which determines the number of virtual channels and the upper and lower time defined bounds for the virtual channels. A policy should contain at least two rules: (1) temporary rule: temporary members are associated with no virtual channel, and (2) permanent rule: permanent members are associated with a fixed virtual channel. An example of a distribuition policy will be provided below. FIG. 3 shows a flow chart of the steps taken by the Key Distributor in assigning a virtual channel. The key distributor maintains a number of virtual channels based on the distribution policy (310). In assigning virtual channels, the key distributor receives a request to join a data group which includes a due date (320). The key distributor determines the status of the user trying to become a member and the time period requested for the user to join the data group (330). If the user meets the acceptance criteria for joining the data group, the key distributor then assigns the user to a virtual channel (350). The acceptance is then sent to the user (360). If the user does not meet with the acceptance scheme the key distributor sends a message denying access to the data group (360).

Figure 4:
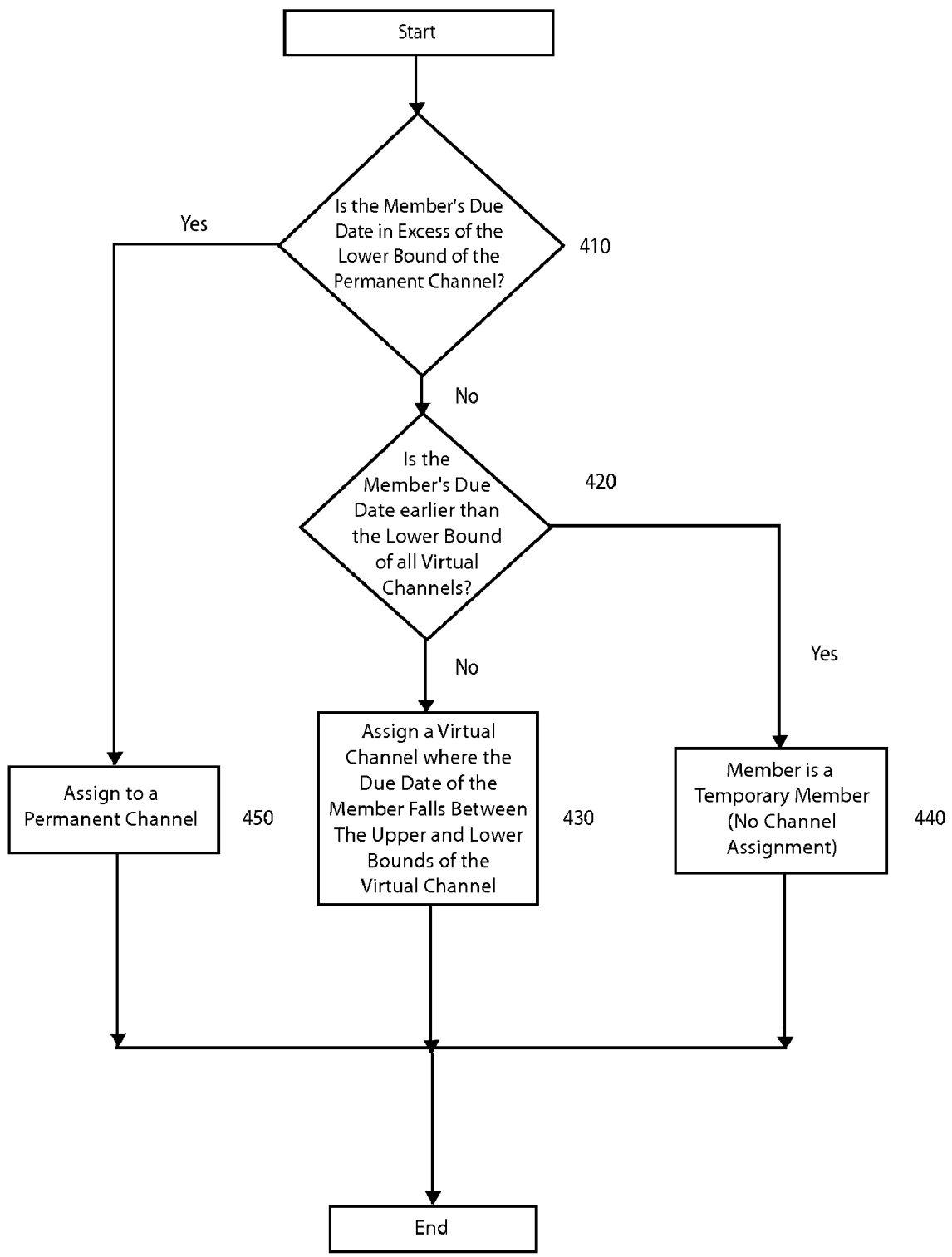
FIG. 4 is a flow chart which shows the steps taken in assigning a member to a virtual channel.

Once a user has been accepted as a member, the key distributor determines the member's virtual channel assignment which is shown in the flow chart of FIG. 4. First the key distributor determines if the time period that the user requested is in excess of the minimum set in the distribution policy for joining a permanent channel (410). If this is the case, the member is assigned to a permanent channel (450). If this is not the case, the key distributor then determines whether the requested time period is less than the minimum time period associated with any virtual channel (420). If the outcome to this query is yes the member is considered a temporary member and is not assigned a virtual channel (440). In all other instances, the member is assigned to the virtual channel where the time period for which the member requested falls between the upper and lower bounds of a virtual channel (430). The key distributor then sends a virtual channel key by means of a unicast session to the member and then the key distributor sends the data group key to the member. In one embodiment of the invention, the key distributor distributes the encrypted data of the data group to the members by means of standard multicast fowarding in other embodiments, another entity distributes the encrypted data.

The key distributor receives signals from members when they wish to join or leave a virtual channel and redistributes the data group key to all remaining members. In virtual channels in which no member joins or leaves the group, the data group key is redistributed via the multicast virtual channels. In the virtual channel where a member joins or leaves, the data group key is redistributed by unicast session to all members of the virtual channel. A virtual channel key is only redistributed when a member leaves or joins a particular virtual channel. If a member does not join or leave the virtual channel, the virtual channel key need not be redistributed for that virtual channel. In such a rekeying scheme bandwidth is saved, since the data group key may be redistributed primarily through the virtual channels, limiting the number of unicast connections. Additionally, bandwidth is conserved for the channel key by only rekeying the channel key to members by unicast session when members join or leave the channel and not rekeying a channel in which membership remains constant.

Acceptance Policy

In the request to join the data group, the user must indicate a date upon which membership in the group is to expire which, for convenience, is referred to as the member's due date. The acceptance of a due date may be constrained by the key administrator based on some criteria. For instance, a request to join a data group may occur and based upon the e-mail address of the user, the user may be denied membership because the user has selected a due date which is not within the choices which are acceptable for the user. The key distributor provides a selection of limited due dates based on the user's e-mail address. The user, may then select the most appropriate choice. In a system in which greater flexability is desired for the user's selection, the key distributor allows the user to enter any due date. The key distributor then compares the e-mail address and due date to a list stored in memory. If the due. date selected falls outside of the range of due dates allowed for the e-mail address the user is denied membership.

Channel Assignment

The time period from the current clock time to the due date is called the member's due time. A member with a due time which is shorter than any virtual channel is called a temporary member. Temporary members are associated with no virtual channel. A member with due time exceeding a certain period is called a permanent member and is associated with a constant virtual channel. In FIG. 1, members 21,22,23 of data group 1 are associated with a due date. Member 21 has a due time which expires in 2 days, and has a due date of January 2, member 22 expires in 3 days and has a due date on January 3, and member 23 expires in 14 days and has a due date of January 14. Member 24 is a permanent member and is assigned to the permanent virtual channel. Member 28 is a temporary member and is not assigned to a virtual channel.

In establishing the virtual channels, the key distributor associates each virtual channel with a time period. Each virtual channel has an upper and lower bound which are dates associated with the time period of the virtual channel. The lower bound of a virtual channel is the earliest due date limit required for members associated with the virtual channel. A member can be assigned to the virtual channel only if the member's due date is not earlier than the lower bound of the virtual channel. The upper bound of a virtual channel is the latest due date limit required for members associated with the virtual channel. A member in a data group is assigned to a virtual channel if the member's due date is not later than the upper bound. For example in FIG. 1, virtual channel A has a lower bound of January 1 and an upper bounds of January 5. If a new group member with a due date of January 6 joins the member will not be assigned to and cannot join virtual channel A, rather this new member would be assigned to virtual channel B.

The due date of a virtual channel is a due date after which all members whose due dates are earlier than the upper bound of the virtual channel will expire. Members in a virtual channel whose due dates are earlier than the due date of the virtual channel are called lower members, and all others are called upper members. For example, channel A of FIG. 1 is a valid channel for a five day period which begins on January 1 and expires on January 5. Member 21 which is valid for 2 days (from January 1-2) and Member 22 which is valid for 3 days (from January 1-3) are considered to be lower members since their due dates fall between the upper and lower bounds of the channel and the due date of the channel is considered to be January 3. For data group 2, virtual channel C has three members 31, 32 and 33. Member 33 is an upper member, since its due date January 9 is greater than the upper bounds of virtual channel C, January 6. A member may only become an upper member once rekeying occurs when a virtual channel is freed as described below. A member cannot be initially assigned to a virtual channel by the key distributor as an upper member since this will violate the distribution policy. For example, virtual channel A of FIG. 1 is a valid virtual channel for a five day period which begins on January 1 and expires on January 5. Member 21 which is valid for 2 days (from January 1-2) and Member 22 which is valid for 3 days (from January 1-3) are considered to be lower members since their due dates fall between the upper and lower bounds of the virtual channel and the due date of the virtual channel is considered to be January 3. For data group 2, virtual channel c has three members 31, 32, and 33. Member 33 is an upper member, since its due date January 9 is greater than the upper bounds of virtual channel C, January 6.

Key Distribution

After the virtual channels are determined by the distribution policy and the members are assigned to a virtual channel, the virtual channel key for the encrypted channel is forwarded to the members through a unicast session. To each temporary member, the key distributor sends the data group key through a secure unicast session. Once the virtual channel key is received by the data group members the key distributor may send the data group key by way of the virtual channel. In FIG. 1, key distributor 20 distributes virtual channel keys first for virtual channels A and B via a unicast session and then sends the data group key for the group on the assigned virtual channels A and B. Likewise key distributor 30 distributes through a unicast session the virtual channel keys to virtual channels C and D to members 31,32,33,34 and 35. Then the data group key for data group 2 is distributed to the members through their respective virtual channels. The key distributor may perform rekeying periodically for the data group key. To do this, the key distributor may obtain or generate a new key for the data group, and sends the new key for the data group on the virtual channel. The virtual channel key need not be redistributed unless a channel becomes freed or the membership of the virtual channel changes.

A virtual channel is freed if (1) an upper member expires; (2) all lower members expire while there is no upper member whose due date is equal or earlier than the upper bound in the virtual channel; or (3) some lower member expires while the other lower members become temporary members. When a virtual channel expires, the remaining lower members change to temporary members and all upper members will be disassociated from the virtual channel and the virtual channel is then freed. The upper members are then reassigned to another virtual channel in which the member's due date is between the upper and lower bounds of the virtual channel.

A default virtual channel may be included in case a member does not fit within any of the virtual channels. Typically a member in the default virtual channel has a due date earlier than the lower bound of the permanent virtual channel, but is later than all other upper bounds. A member with the earliest due date in the default virtual channel is called a lower edge member of the default virtual channel. The due date of a lower edge member of the default virtual channel is called the lower bound of the default virtual channel. The upper bound of the default virtual channel is the lower bound of the permanent virtual channel.

Rekeying when Membership of the Group Changes

When a member joins the data group, the key distributor determines whether the member is a temporary member. If so, the key distributor sends the existing data group key to the temporary member through a unicast session. When a temporary member expires or leaves, the member is no longer qualified for receiving data for the data group and thus the key distributor no longer forwards the data group key to this expired member. When this occurs, the key distributor rekeys the entire data group. In this case, the key distributor obtains or generates a new key for the data group, and applies the data group key distribution procedure to the new key.

If a new member joins a data group and has a due date which is later than the lower bound of a certain virtual channel, the key distributor assigns the virtual channel, sends the virtual channel key to the member through a unicast session with the member, requests the member to join the virtual channel through IGMP Membership Report messages, and sends the data group key to the member through the virtual channel.

When a member leaves a data group, the key distributor has to do rekeying for the data group. If the leaving member is associated with a virtual channel, the key distributor generates a new virtual channel key for the virtual channel, and sends the new virtual channel key to each individual member (excluding the leaving member) through a unicast session. The key distributor then obtains or generates a new data group key for the data group, and applies the data group key distribution procedure to the new data group key. If, as a result, the virtual channel expires, the key distributor will further process the expiration of the virtual channel as described below.

If a member associated with a virtual channel expires, it is no longer qualified for receiving data for the data group through the multicast secure virtual channel. The key distributor has to do rekeying for both the virtual channel and the data group. To do rekeying for the virtual channel, the key distributor obtains or generates a new virtual channel key for the virtual channel, and applies the virtual channel key distribution procedure to the new virtual channel key. However, the new virtual channel key should not be distributed to the expiring member. To do rekeying for the data group, the key distributor obtains or generates a new data group key for the data group, and applies the data group key distribution procedure to the new data group key.

Before proceeding with the rekeying, the key distributor should determine if the virtual channel has been freed as a result of the member's expiration. If the channel has expired, the key distributor processes the expiration of the channel as described in the next section and then performs rekeying for the data group. Otherwise, the key distributor performs rekeying for both the channel and the data group.

Rekeying when a Virtual Channel is Freed

For the following discussion, the virtual channels are arranged in the order of expiration so that the virtual channel with the lowest upper bounds is the bottom virtual channel and the virtual channel with the highest upper bounds is the top virtual channel. The default virtual channel is ordered before the permanent virtual channel but after other virtual channels. We call the virtual channel immediately followed by the default virtual channel as the top virtual channel while the first virtual channel is called the bottom virtual channel. There is no gap between the upper bound of a virtual channel and the lower bound of the subsequent virtual channel, except that there may be a gap between the top virtual channel and the default virtual channel. The virtual channel list, starting from the bottom virtual channel and ending with the default virtual channel, is called the virtual channel chain. Such a classification of order is only for illustrative purposes as all virtual channels are virtual and do not have an actual order or physical location.

When the bottom virtual channel is freed, the key distributor rotates the virtual channel chain in such a way that the virtual channel following the bottom virtual channel becomes the bottom virtual channel, the default virtual channel becomes the top virtual channel, and the freed bottom virtual channel becomes the default virtual channel. The term "rotate" is provided for illustrative purposes, since no physical rotation actually occurs. When virtual channels are "rotated" new upper and lower bounds are associated with the virtual channel, however the members of the virtual channel may remain and therefore the virtual channel key need not be rekeyed. The lower and upper bounds of all virtual channels from the bottom through the top virtual channel should be reconfigured in accordance with the distribution policy. If after the reconfiguration, the due date of the lower edge member of the original default virtual channel is later than its new upper bound as the top virtual channel, the key distributor swaps the new the top virtual channel and the new default virtual channel such that, the original default virtual channel remains as the default one, the freed bottom virtual channel becomes the new the top virtual channel, and the lower and upper bounds of the new the top virtual channel are reset in accordance with the distribution policy. After rotating the virtual channel chain the key distributor should not move members between various virtual channels in the virtual channel chain.

A virtual channel can expire while still having members in the virtual channel. By definition when the virtual channel expires all lower members have expired, however upper members may still be present. In this case, the key distributor frees the expiring virtual channel, and rotates the virtual channel chain. For each upper member of the expiring virtual channel, the key distributor re-assigns the upper member to another virtual channel according to the key distribution policy, sends the upper member the virtual channel key for the new virtual channel through the unicast secure session, and requests the upper member to join the new virtual channel through IGMP Membership Report messages. The key distributor then obtains or generates a new data group key for the data group, and applies the data group key distribution procedure to the new data group key.

An Example

FIGS. 5-12 presents an example of the methodology used in distributing keys in a multicast. This example is not meant to limit the scope of the invention and is provided to show some of the possible situations that occur in applying the method. In this example a key distributor has the following key distribution policy:

A member whose due time is one day is a temporary member;

A member whose due time is equal or greater than one month is a permanent member;

A member whose due time is between one day and two days is in the bottom Virtual channel;

A member whose due time is between three days and one week is in the second virtual channel;

A member whose due time is between one week and two weeks is in the top virtual channel.

Figure 5:
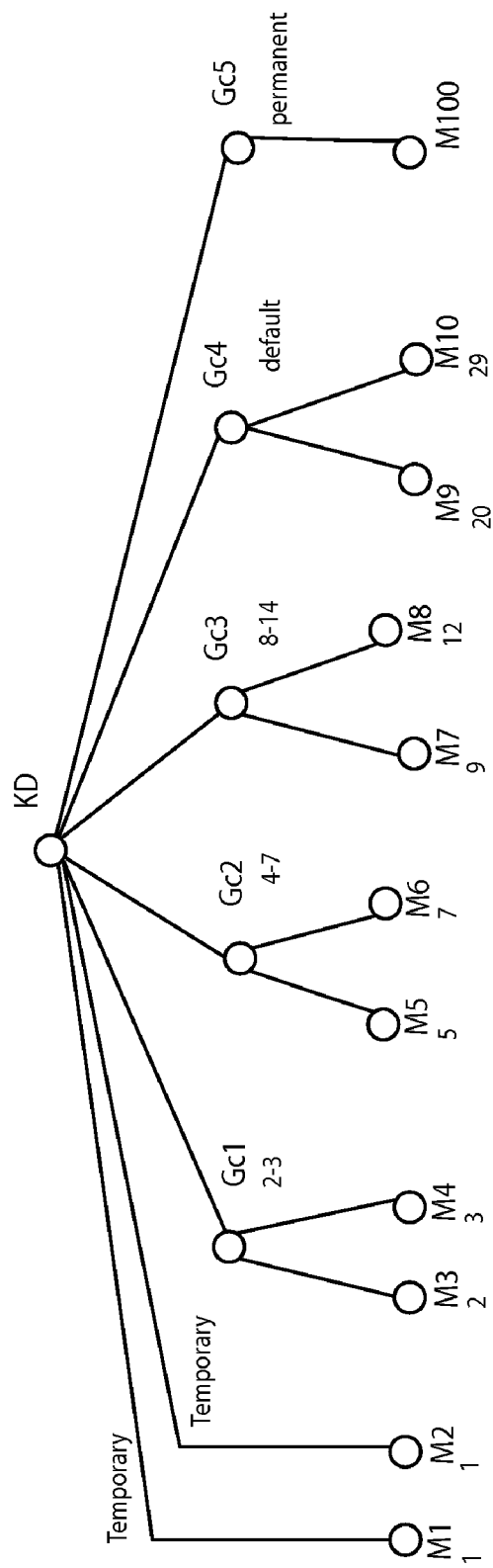
FIG. 5 shows a key distributor communicating with members in a data group over multiple virtual channels in an example of the methodology for encryption key distribution.

In FIG. 5, M1-M10 and M100 are members of a data group which are assigned to a virtual channel or are temporary members. The key distributor KD provides the virtual channel key and the data group key to each of the members. The numbers associated with M1 through M10 are due dates. On January 1st members M1 and M2 are temporary members and have no associated virtual channel. M3 through M10 are placed in virtual channel Gc1 through Gc4 according to their due dates. Each member's due date falls between the lower and upper bounds of the virtual channel which are the indicated number ranges. All members of the virtual channels are lower members, since rotation has not yet occurred. M100 is a permanent member.

Figure 6:
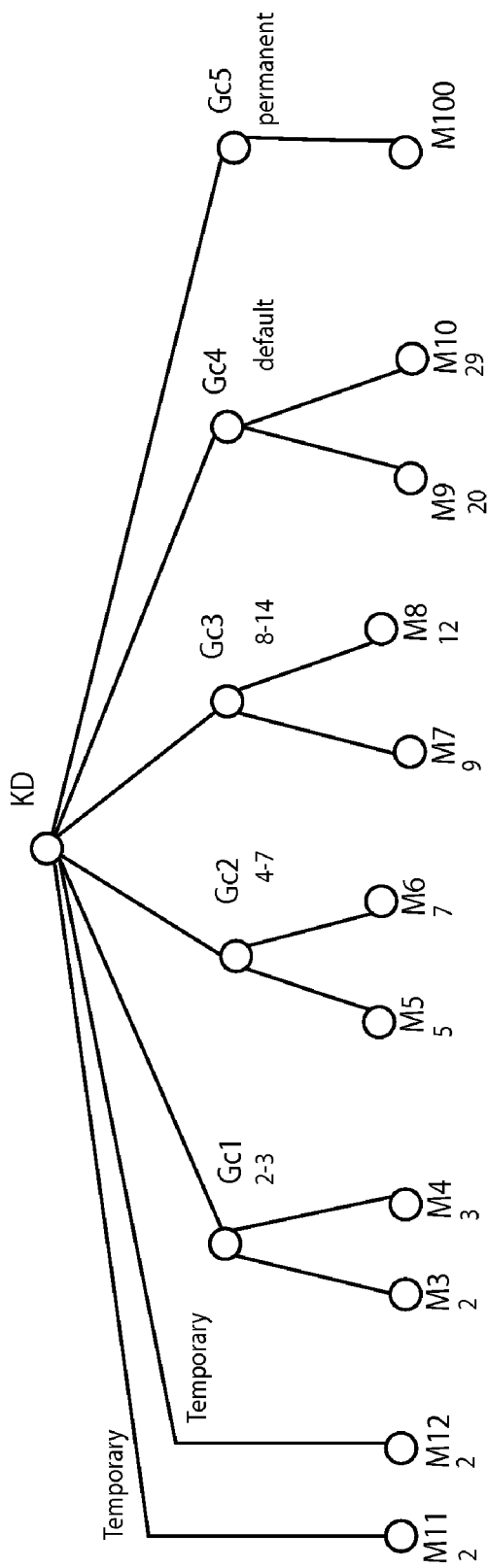
FIG. 6 shows the results of changes to FIG. 5 that occur on day two.

FIG. 6 shows the group distribution on January 2nd. Temporary member M1 and M2 expire, but new member M1 and M12 join as temporary members. As a result, the key distributor generates a new data group key distributing the data group key to the temporary members in a unicast session and delivering the data group key to all other members via their respective virtual channels. Virtual channel membership of Gc1, Gc2, Gc3, or Gc4 does not change and therefore the key distributor does not redistribute any virtual channel keys.

Figure 7:
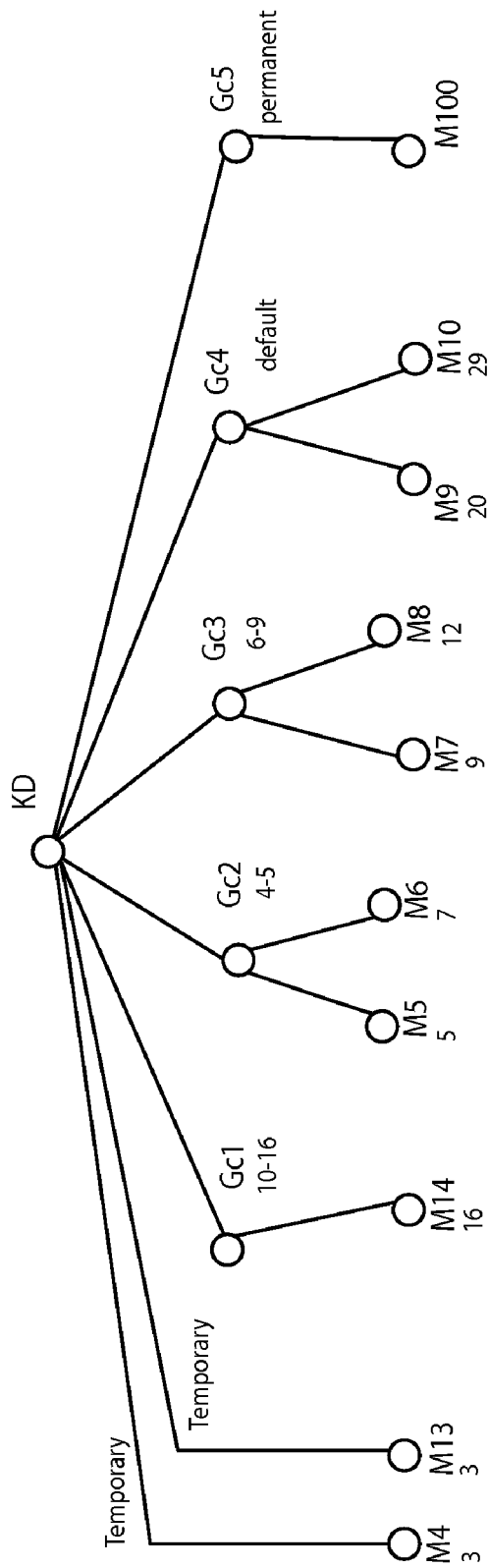
FIG. 7 shows the results of changes to FIG. 5 that occur on day three.

FIG. 7 shows the group distribution on January 3rd. Temporary member M1 and M12 expire. M3 expires, member M4 of Gc1 becomes a temporary member since M4's due date is January 3, and as a result, virtual channel Gc1 is freed. The virtual channel chain is rotated. Gc2 becomes the bottom virtual channel and Gc1 becomes the top virtual channel. Gc2 being the bottom virtual channel is valid for only the next two days which are January 4-5. Likewise Gc3 is valid for the next 3 days after Gc2 expires which is January 6-9. The top virtual channel, Gc1 is valid for seven days after the expiration of Gc3 from January 10-16. M13 joins as a temporary member. M14, with a due date as January 16, joins and is assigned to Gc1 because M14 falls within the bounds of Gc1. The data group key is redistributed since group membership has changed and the virtual channel key for Gc1 is changed and redistributed to M14.

Figure 8:
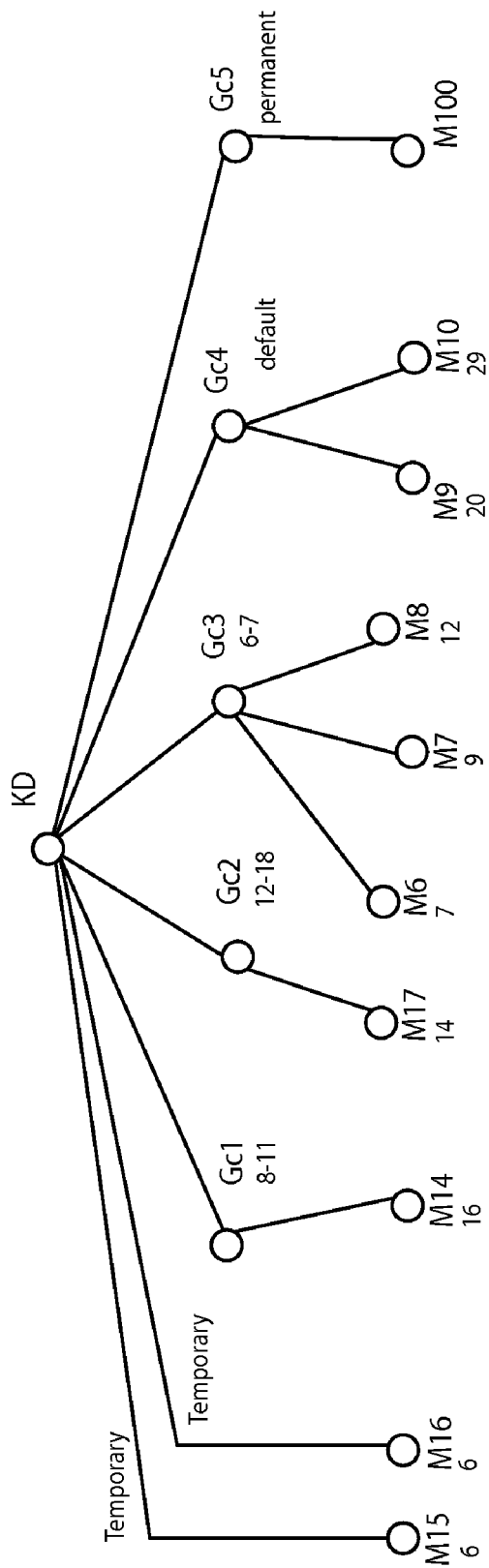
FIG. 8 shows the results of changes to FIG. 5 that occur on day six.

FIG. 8 shows the group distribution on January 6th. Temporary members M4 and M13 expire while members M15 and M16 join as temporary members. Member M5 expires, which triggers Gc2 to be freed. The virtual channel chain is then rotated and Gc3 becomes the bottom virtual channel and Gc2 becomes the top virtual channel. M6, which was an upper member of freed virtual channel Gc2, is reassigned to Gc3, since M6 falls within the upper and lower bounds of Gc3. Since the membership of Gc2 and Gc3 changed, the key distributor provides new virtual channel keys to all of the members of the virtual channels. Additionally the data group membership changes and the data group key is redistributed to all members.

Figure 9:
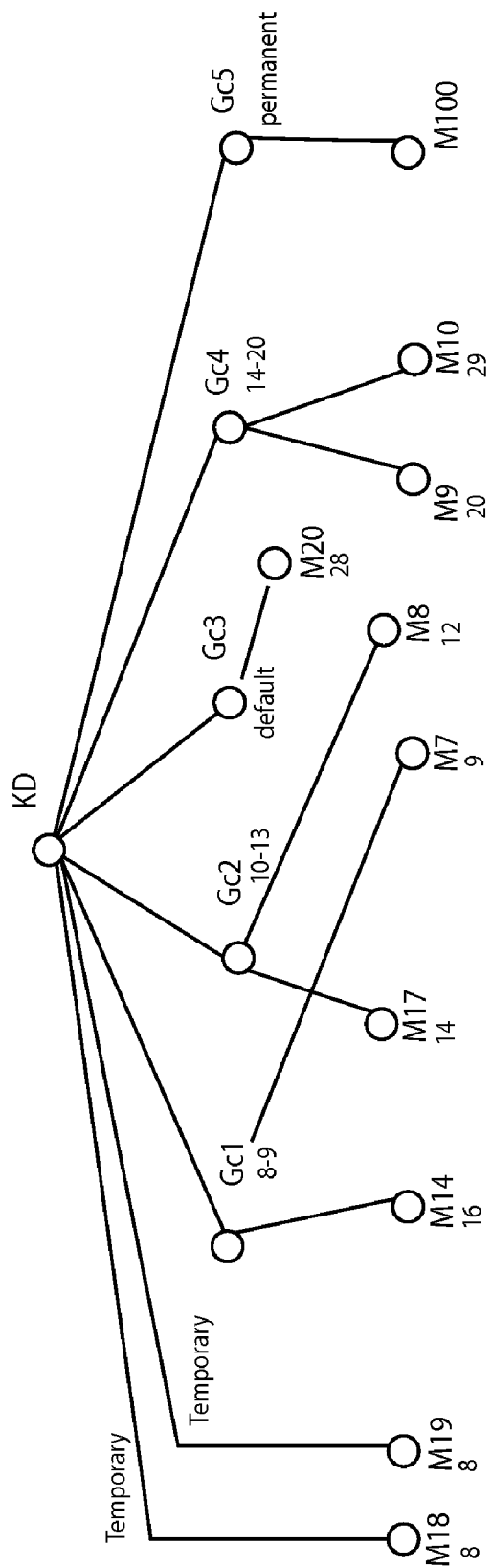
FIG. 9 shows the results of changes to FIG. 5 that occur on day eight.

FIG. 9 shows the group distribution on January 8th. Temporary member M15 and M16 expire and M18 and M19 join as temporary members. M6 expires, which triggers Gc3 freed. The virtual channel chain is rotated. Gc1 becomes the bottom virtual channel, Gc4 becomes the top virtual channel and Gc3 becomes the default virtual channel. M7 which was previously part of Gc3 is reassigned to Gc1, since Gc1 has an upper and lower bounds of January 8-9 and M7's due date is on January 9th. M8 is reassigned to Gc2 because Gc3 is freed and M8 falls within the bounds of Gc2. M20 joins and is assigned to the default virtual channel because its due date is greater than that of the upper virtual virtual channel, but not longer than one month to become a permanent member.

Figure 10:
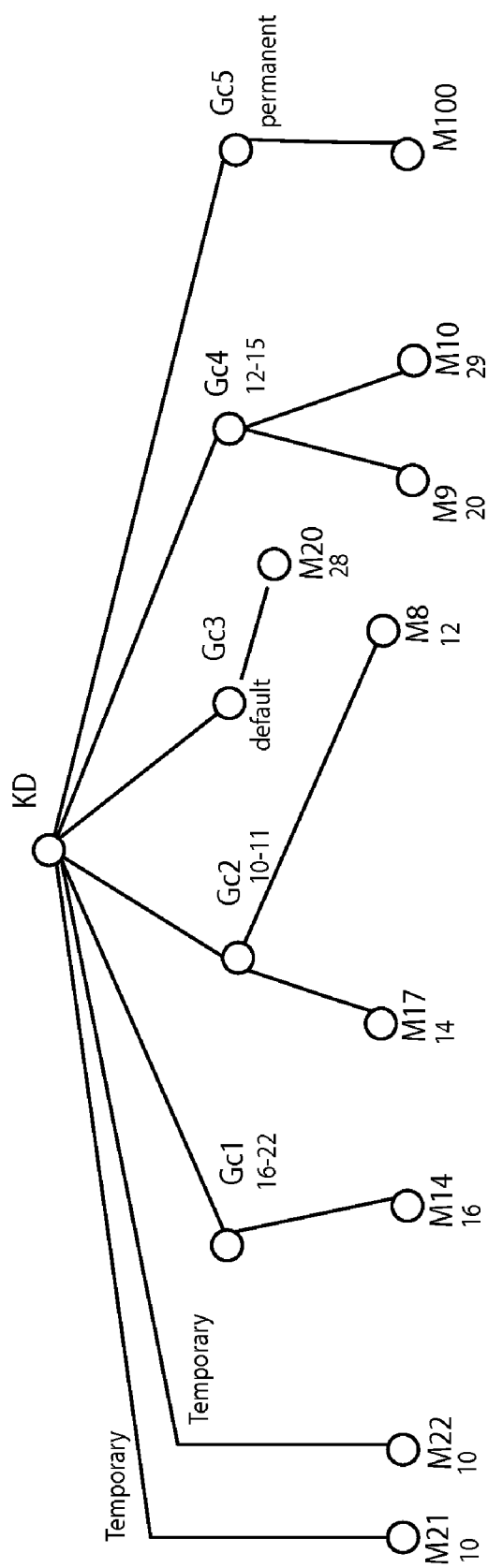
FIG. 10 shows the results of changes to FIG. 5 that occur on day ten.

FIG. 10 shows the group distribution on January 10th. Temporary member M18 and M19 expire and M21 and M22 join as temporary members. M7 expires, which triggers Gc1 freed. The virtual channel chain is rotated. Gc2 becomes the bottom virtual channel and Gc1 becomes the top virtual channel. No members of virtual channels Gc2, Gc3 or Gc4 change and therefore the virtual channel key for these virtual channels is not rekeyed. The virtual channel key for Gc1 is rekeyed since M7 has left. Also, since M7 has left the data group key is rekeyed. Each time a member joins or leaves the data group the data group key is rekeyed.

Figure 11:
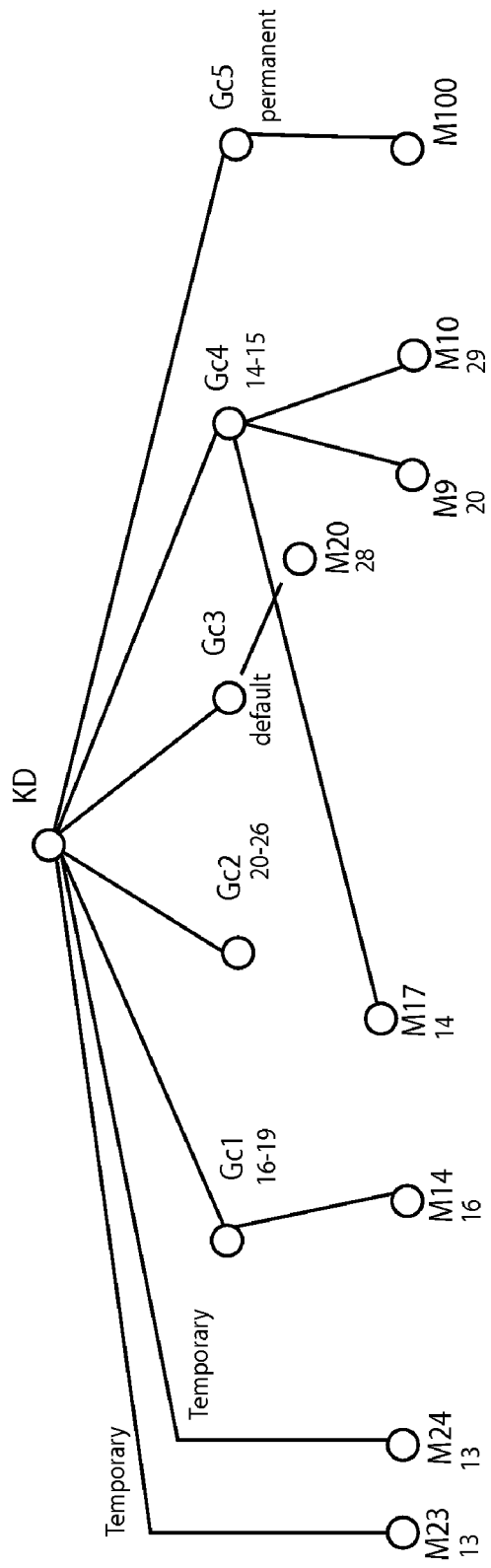
FIG. 11 shows the results of changes to FIG. 5 that occur on day thirteen.

FIG. 11 shows the group distribution on January 13th. Temporary member M21 and M22 expire. M8 expires, which triggers Gc2 freed. The virtual channel chain is rotated. Gc4 becomes the bottom virtual channel and Gc2 becomes the top virtual channel. M17 is re-assigned to Gc4. M23 and M24 join as temporary members.

Figure 12:
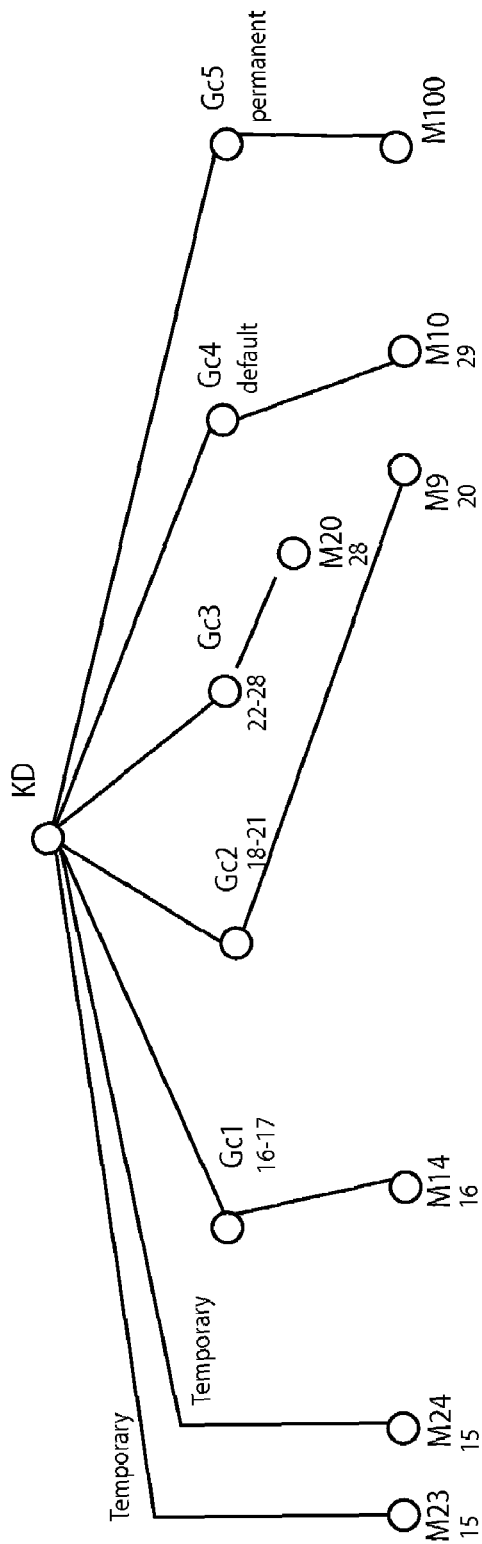
FIG. 12 shows the results of changes to FIG. 5 that occur on day fifteen.

FIG. 12 shows the group distribution on January 15th. Temporary member M23 and M24 expire. M17 expires, which triggers Gc4 freed. The virtual channel chain is rotated. Gc1 becomes the bottom virtual channel and Gc3 becomes the top virtual channel. Gc4 changes back as the default virtual channel. M9 is re-assigned to Gc2, and M10 is assigned to Gc4. M23 and M24 join as temporary members.

Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as preprogrammed hardware elements (e.g., application specific integrated circuits), or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

I claim:

1. A method of distributing a single video conference to at least three member devices via a multicast data group and a multicast session, the method comprising the steps of:

establishing a plurality of virtual channels for the video conference multicast session, each virtual channel simultaneously carrying multiple streams of video conference data of the single video conference, each stream transmitted from a different member device, each virtual channel defined by an amount of time remaining until expiration, at least two of which are different, and being operable to deliver the same video conference to member devices associated with that respective virtual channel;

receiving, at a key distributor device, a request from a requester device to join the multicast session, the request device indicating a requested start time for joining the video conference and an amount of time of utilization of the multicast session;

selecting a virtual channel from the plurality of virtual channels for communications by the requestor by correlating the start time and the amount of time indicated by the requestor with the amount of time remaining until expiration of the virtual channels at that start time;

forwarding a new key for the selected virtual channel to the requester;

forwarding the new virtual channel key to all pre-existing members of the selected virtual channel;

distributing the video conference data signal to the members of the multicast group via each of the virtual channels, whereby the requestor device joins the video conference multicast data group without prompting re-keying of other member devices of the video conference associated with virtual channels other than the selected virtual channel.

2. A method according to claim 1, wherein each virtual channel of the plurality of virtual channels is associated with a different time duration.

3. A method according to claim 1, wherein no member can be in more than one virtual channel.

4. A method according to claim 1, further comprising: distributing a data key to each multicast virtual channel.

5. The method according to claim 1, wherein all of the virtual channels reside within one domain.

6. The method according to claim 1, further comprising: rekeying the virtual channel key when membership of the virtual channel changes.

7. The method according to claim 6, wherein in the act of rekeying at least one member is present in the virtual channel after the membership changes.

8. The method according to claim 2, associating an unlimited time duration with a virtual channel creating a permanent virtual channel.

9. The method according to claim 2, wherein a member may join a virtual channel for less than the virtual channel's full time duration.

10. The method according to claim 2, further comprising: creating a lower and upper bounds for the virtual channel based on the time duration of the virtual channel.

11. A method according to claim 2, further comprising: reassigning time duration for a virtual channel if a virtual channel is freed.

12. A method according to claim 2, further comprising: reassigning time duration for all virtual channels if a virtual channel is freed.

13. The method according to claim 11, wherein a virtual channel is freed when an upper member expires.

14. The method according to claim 11, wherein a virtual channel is freed when all members expires.

15. The method according to claim 12, wherein in the act of reassigning further comprises the step of reconfiguring the lower and upper bounds of all virtual channels.

16. The method according to claim 11, wherein only the freed virtual channel rekeys the virtual channel key to all members of the freed virtual channel.

17. An apparatus for distributing a single video conference to at least three member devices via a multicast data group and a multicast session, the apparatus comprising:
control logic operable to establish a plurality of virtual channels for the video conference multicast session, each virtual channel simultaneously carrying multiple streams of video conference data of the single video conference, each stream transmitted from a different member device, each virtual channel defined by an amount of time remaining until expiration, at least two of which are different, and being operable to deliver the same video conference to member devices associated with that respective virtual channel;

a receiver for receiving a request from a requestor device to join the multicast session, the request indicating a requested start time for joining the video conference and an amount of time of utilization of the multicast session;

an assignment module for selecting a virtual channel from the plurality of virtual channels for communications by the requestor by correlating the start time and the amount of time indicated with the amount of time remaining until expiration of the virtual channels at that start time;

a requester forwarding module for forwarding a new virtual channel key for the selected virtual channel to the requester;

a member forwarding module for forwarding the new virtual channel key to all pre-existing members of the selected virtual channel;

a transmitter for distributing the video conference data signal to the members of the multicast group via each of the virtual channels, whereby the apparatus enables the requestor device to join the video conference multicast data group without prompting re-keying of other member devices of the video conference associated with virtual channels other than the selected virtual channel.

18. The apparatus according to claim 17, further comprising:
a virtual channel module which creates each virtual channel based on a time duration.

19. The apparatus according to claim 17, wherein the assignment module prevents a member from being in more than one virtual channel.

20. The apparatus according to claim 17, further comprising:
a data key distributor for distributing a data key to each multicast virtual channel.

21. The apparatus according to claim 17, wherein the apparatus controls the multicast virtual channels which reside within one domain.

22. The apparatus according to claim 17, further comprising:
a rekeying module for rekeying a virtual channel when membership of the virtual channel changes.

23. The apparatus according to claim 18, wherein the virtual channel module creates a permanent virtual channel with an unlimited duration.

24. The apparatus according to claim 18, wherein the receiver may receive a request to join a virtual channel for less than the virtual channel's full time duration.

25. The apparatus according to claim 18, wherein the virtual channel module creates a lower and upper bounds for the virtual channel based on the time duration of the virtual channel.

26. The apparatus according to claim 18, further comprising:
a reassignment module for reassigning time duration for a virtual channel if the virtual channel is freed.

27. The apparatus according to claim 18, further comprising:
   a reassignment module for reassigning time duration for all virtual channels if a virtual channel is freed.

28. The apparatus according to claim 27, wherein a virtual channel is freed when an upper member expires.

29. The apparatus according to claim 27, wherein a virtual channel is freed when all members expire.

30. The apparatus according to claim 27, wherein the reassignment module reconfigures the lower and upper bounds of all virtual channels.

31. The apparatus according to claim 22, wherein the rekeying module rekeys the virtual channel key to all members of a freed virtual channel.

32. A computer program product for use on a computer system for facilitating distribution of a single video conference to at least three member devices via a multicast data group and a multicast session, the computer program product comprising a computer usable medium having computer readable program code thereon, the computer readable program code including:
   computer code operable to establish a plurality of virtual channels for the video conference multicast session, each virtual channel simultaneously carrying multiple streams of video conference data of the single video conference, each stream transmitted from a different member device, each virtual channel defined by an amount of time remaining until expiration, at least two of which are different, and being operable to deliver the same video conference to member devices associated with that respective virtual channel;
   receiving a request from a requestor device to join the multicast session, the request indicating a requested start time for joining the video conference and an amount of time of utilization of the multicast session;
   computer code for selecting a virtual channel from the plurality of virtual channels for communications by the requester by correlating start time and the amount of time indicated by the requestor with the amount of time remaining until expiration of the virtual channels at that start time;
   computer code for forwarding a new key for the selected virtual channel to the requester;
   computer code for forwarding the new virtual channel key to all pre-existing members of the selected virtual channel;
   computer code for distributing the video conference data signal to the members of the multicast group via each of the virtual channels,
   whereby the requestor device joins the multicast data group without prompting re-keying of other member devices of the video conference associated with virtual channels other than the selected virtual channel.

33. A computer program product according to claim 32, wherein each virtual channel is associated with a time duration.

34. A computer program according to claim 32, wherein no member can be in more than one virtual channel.

35. A computer program product according to claim 32, further comprising:
   computer code for distributing a data key to each multicast virtual channel.

36. The computer program product according to claim 32, wherein all of the virtual channels reside within one domain.

37. The computer program product according to claim 32, further comprising:
   computer code for rekeying the virtual channel key when membership of the virtual channel changes.

38. The computer program product according to claim 33, further comprising:
   computer code for associating an unlimited duration with a virtual channel creating a permanent virtual channel.

39. The computer program product according to claim 33, wherein a member may join a virtual channel for less than the virtual channel's full time duration.

40. The computer program product according to claim 33, further comprising:
   computer code for creating a lower and upper bounds for the virtual channel based on the time duration of the virtual channel.

41. The computer program product according to claim 33, further comprising:
   computer code for reassigning time duration for a virtual channel if a virtual channel is freed.

42. The computer program product according to claim 33, further comprising:
   computer code for reassigning time duration for all virtual channels if a virtual channel is freed.

43. The computer program product according to claim 41, wherein a virtual channel is freed when an upper member expires.

44. The computer program product according to claim 41, wherein a virtual channel is freed when all members expire.

45. The computer program product according to claim 42, wherein the computer code for reassigning, further comprises:
   computer code for reconfiguring the lower and upper bounds of all virtual channels.

46. The computer program product according to claim 37, further comprising computer code for rekeying a virtual channel key only to the members of a freed virtual channel.

47. A method of creating a secure multicast session for delivering a single video conference to at least three members, the method comprising:
   establishing, by a network device, a plurality of virtual channels for the multicast session, each virtual channel simultaneously carrying multiple streams of video conference data of the single video conference, each stream transmitted from a different member device, each virtual channel defined by an amount of time remaining until expiration, at least two of which are different, and being operable to deliver the same video conference to member devices associated with that respective virtual channel;
   associating each member with one of the plurality of multicast virtual channels by correlating an amount of time and a start time indicated by the member with an amount of time remaining until expiration of the virtual channels at that start time;
   distributing virtual channel keys to the members, each member receiving one virtual channel key selected based upon their associated virtual channel;
   for at least one of the virtual channels, rekeying the virtual channel key when membership of the virtual channel changes.

48. A method according to claim 47, wherein the virtual channel key is sent in a unicast session to each member.

49. A method according to claim 47, wherein each virtual channel is associated with a time duration.

50. A method according to claim 47, wherein no member can be in more than one virtual channel.

51. A method according to claim 47, further comprising: distributing a data key to each multicast virtual channel.

52. The method according to claim 47, wherein all of the virtual channels reside within one domain.

53. The method according to claim 47, wherein in the act of rekeying at least one member is present in the virtual channel after the membership changes.

54. The method according to claim 48, associating an unlimited duration with a virtual channel creating a permanent virtual channel.

55. The method according to claim 48, wherein a member may join a virtual channel for less than the virtual channel's full time duration.

56. The method according to claim 48, further comprising creating a lower and upper bounds for the virtual channel based on the time duration of the virtual channel.

57. A method according to claim 48, further comprising: reassigning time duration for a virtual channel if a virtual channel is freed.

58. A method according to claim 48, further comprising: reassigning time duration for all virtual channels if a virtual channel is freed.

59. The method according to claim 57, wherein a virtual channel is freed when an upper member expires.

60. The method according to claim 57, wherein a virtual channel is freed when all members expire.

61. The method according to claim 58, wherein in the act of reassigning further comprises the step of reconfiguring the lower and upper bounds of all virtual channels.

62. The method according to claim 58, wherein only the freed virtual channel rekeys the virtual channel key to all members of the freed virtual channel.

63. An apparatus including a computer usable medium having computer readable program code thereon which is executed by the apparatus for creating a secure multicast session for delivering a single video conference to at least three members, the computer readable program code comprising:
a control module for establishing a plurality of virtual channels for the multicast session, each virtual channel simultaneously carrying multiple streams of video conference data of the single video conference, each stream transmitted from a different member device, each virtual channel defined by an amount of time remaining until expiration, at least two of which are different, and being operable to deliver the same video conference to member devices associated with that respective virtual channel;
an associator module for associating each member with one of the plurality of multicast virtual channels by correlating an amount of time and a start time indicated by the member with an amount of time remaining until expiration of the virtual channels at that start time;
a distribution module for distributing virtual channel keys to the members, each member receiving one virtual channel key selected based upon their associated virtual channel;
a rekeying module operable with at least one of the virtual channels for rekeying the virtual channel key when membership of the virtual channel changes.

64. The apparatus according to claim 63, wherein in distribution module the virtual channel key is sent in a unicast session to each member.

65. The apparatus according to claim 63, wherein the computer readable program code further comprises:
a virtual channel module which creates each virtual channel based on a time duration.

66. The apparatus according to claim 63, wherein the assignment module prevents a member from being in more than one virtual channel.

67. The apparatus according to claim 63, wherein the computer readable program code further comprises:
a data key distributor for distributing a data key to each multicast virtual channel.

68. The apparatus according to claim 63, wherein the multicast virtual channels reside within one domain.

69. The apparatus according to claim 65, wherein the virtual channel module creates a permanent virtual channel with an unlimited duration.

70. The apparatus according to claim 65, wherein a receiver may receive a request to join a virtual channel for less than the virtual channel's full time duration.

71. The apparatus according to claim 65, wherein the virtual channel module creates a lower and upper bounds for the virtual channel based on the time duration of the virtual channel.

72. The apparatus according to claim 65, wherein the computer readable program code further comprises:
a reassignment module for reassigning time duration for a virtual channel if the virtual channel is freed.

73. The apparatus according to claim 65, wherein the computer readable program code further comprises:
a reassignment module for reassigning time duration for all virtual channels if a virtual channel is freed.

74. The apparatus according to claim 72, wherein a virtual channel is freed when an upper member expires.

75. The apparatus according to claim 72, wherein a virtual channel is freed when all members expire.

76. The apparatus according to claim 73, wherein the reassignment module reconfigures the lower and upper bounds of all virtual channels.

77. The apparatus according to claim 63, wherein the rekeying module rekeys the virtual channel key to all members of a freed virtual channel.

78. A computer program product for use on a computer system for creating a secure multicast session for delivering a single video conference to at least three members, the computer program product comprising a computer usable medium having computer readable program code thereon, the computer readable program code including:
computer code for establishing a plurality of virtual channels for the multicast session, each virtual channel simultaneously carrying multiple streams of video conference data of the single video conference, each stream transmitted from a different member device, each virtual channel defined by an amount of time remaining until expiration, at least two of which are different, and being operable to deliver the same video conference to member devices associated with that respective virtual channel;
computer code for associating each member with one of the plurality of multicast virtual channels by correlating an amount of time and a start time indicated by the member with an amount of time remaining until expiration of the virtual channels at that start time;
computer code for distributing virtual channel keys to the members, each member receiving one virtual channel key selected based upon their associated virtual channel;
computer code operable for at least one of the virtual channels for rekeying the virtual channel key when membership of the virtual channel changes.

79. The apparatus according to claim 78, wherein in distribution module the virtual channel key is sent in a unicast session to each member.

80. A computer program product according to claim 78, wherein each virtual channel is associated with a time duration.

81. A computer program product according to claim 78, wherein no member can be in more than one virtual channel.

82. A computer program product according to claim 78, further comprising:
   computer code for distributing a data key to each multicast virtual channel.

83. The computer program product according to claim 78, wherein all of the virtual channels reside within one domain.

84. The computer program product according to claim 80, further comprising:
   computer code for associating an unlimited duration with a virtual channel creating a permanent virtual channel.

85. The computer program product according to claim 80, wherein a member may join a virtual channel for less than the virtual channel's full time duration.

86. The computer program product according to claim 80, further comprising
   computer code for creating a lower and upper bounds for the virtual channel based on the time duration of the virtual channel.

87. The computer program product according to claim 80, further comprising:
   computer code for reassigning time duration for a virtual channel if a virtual channel is freed.

88. The computer program product according to claim 80, further comprising:
   computer code for reassigning time duration for all virtual channels if a virtual channel is freed.

89. The computer program product according to claim 81, wherein a virtual channel is freed when an upper member expires.

90. The computer program product according to claim 81, wherein a virtual channel is freed when all members expire.

91. The computer program product according to claim 82, wherein the computer code for reassigning further comprises computer code for reconfiguring the lower and upper bounds of all virtual channels.

92. The computer program product according to claim 80, further comprising computer code for rekeying a virtual channel key only to the members of the freed virtual channel.

* * * * *